US012759011B2

(12) United States Patent
Lelandais et al.

(10) Patent No.: US 12,759,011 B2
(45) Date of Patent: Oct. 13, 2026

(54) APPARATUS FOR APPLYING A LIQUID MATERIAL AND METHOD FOR DETERMINING A FUNCTION USED TO OPERATE THE APPARATUS

(71) Applicant: Henkel AG & Co. KGaA, Duesseldorf (DE)

(72) Inventors: Thibaut Lelandais, Mainvilliers (FR); Michel Gambuto, Nogent le Roi (FR); Paul Baietto, Marcheville (FR); Damien Fourcade, Cologne (DE); John J. Stankiewicz, Tyngsboro, MA (US); Gerrit Jan Odink, Roermond (NL); Tomasz Gasior, Zgierz (PL)

(73) Assignee: Henkel AG & Co. KGaA, Duesseldorf (DE)

( * ) Notice: Subject to any disclaimer, the term of this patent is extended or adjusted under 35 U.S.C. 154(b) by 119 days.

(21) Appl. No.: 18/884,699

(22) Filed: Sep. 13, 2024

(65) Prior Publication Data

US 2025/0001448 A1 Jan. 2, 2025

Related U.S. Application Data

(63) Continuation of application No. PCT/EP2023/055686, filed on Mar. 7, 2023.

(30) Foreign Application Priority Data

Mar. 15, 2022 (EP) ..................................... 22162343
Mar. 31, 2022 (EP) ..................................... 22165892

(51) Int. Cl.
*B05C 11/10* (2006.01)
*B05C 5/02* (2006.01)

(52) U.S. Cl.
CPC ............ *B05C 11/1013* (2013.01); *B05C 5/02* (2013.01); *B05C 11/1042* (2013.01)

(58) Field of Classification Search
CPC ... B05C 11/1013; B05C 5/02; B05C 11/1042; B05C 5/0216; B05C 11/1044; B05C 11/1007
See application file for complete search history.

(56) References Cited

U.S. PATENT DOCUMENTS 5,992,686 A * 11/1999 Cline ......................... B29B 7/94 222/63
6,730,168 B1 * 5/2004 Ross ..................... B05C 5/0216 118/314

(Continued)

FOREIGN PATENT DOCUMENTS

CN 205797657 U 12/2016
DE 102013112686 A1 * 5/2015 ......... B05C 11/1002

(Continued)

OTHER PUBLICATIONS

International Search Report for PCT/EP2023/055686 mailed Jun. 12, 2023, 3 pages.

*Primary Examiner* — Bob Zadeh
(74) *Attorney, Agent, or Firm* — Mary K. Cameron

(57) ABSTRACT

Provided is an apparatus for applying a liquid material to a plurality of parts, wherein the apparatus comprises at least a first gun through which the material can be applied to the parts; a reservoir for holding the material, the reservoir being fluidically connected to the first gun; a pressure system for providing a gas pressure acting on the material located in the reservoir, the pressure system having a pressure regulator, by which the gas pressure acting on the material can be adjusted, and a pressure sensor for detecting the gas pressure acting on the material; a temperature sensor for detecting the temperature of the material; and a control unit in which a (Continued)

material-specific function is stored which specifies a setpoint value for the gas pressure which depends on the detected temperature of the material. The invention also provides a method to determine the material-specific function.

11 Claims, 3 Drawing Sheets

(56) References Cited

U.S. PATENT DOCUMENTS

| | | | | |
|---|---|---|---|---|
| 9,616,446 | B2 * | 4/2017 | Hirota | B05B 15/58 |
| 10,076,828 | B2 * | 9/2018 | Ross | B05C 5/0204 |
| 2008/0141702 | A1 * | 6/2008 | Gagliano | B67D 1/1275 62/389 |
| 2012/0168532 | A1 * | 7/2012 | Giles | B01F 25/312 222/1 |
| 2025/0001448 | A1 * | 1/2025 | Lelandais | B05C 11/1013 |

FOREIGN PATENT DOCUMENTS

| | | | | | |
|---|---|---|---|---|---|
| EP | 947900 | A2 | * | 10/1999 | |
| EP | 2684615 | A1 | * | 1/2014 | B05C 11/1013 |
| EP | 3932647 | A1 | | 1/2022 | |
| WO | 2005016553 | A1 | | 2/2005 | |
| WO | WO-2008005564 | A2 | * | 1/2008 | B65D 47/242 |
| WO | WO-2011058842 | A1 | * | 5/2011 | B05C 11/1007 |
| WO | 2019120919 | A1 | | 6/2019 | |

* cited by examiner

APPARATUS FOR APPLYING A LIQUID MATERIAL AND METHOD FOR DETERMINING A FUNCTION USED TO OPERATE THE APPARATUS

TECHNICAL FIELD

The invention relates to an apparatus for applying a liquid material to a plurality of parts, the apparatus comprising a first material gun through which the material can be applied to the parts. Further, the invention comprises a method for determining a material specific function used in the operation of the apparatus.

BACKGROUND

From WO 2019/120919 an apparatus with eight material guns is known, which comprises a reservoir for receiving the liquid material. A gas pressure is provided by a pressure system, which acts on the material contained in the reservoir. The eight guns (material guns) are mounted on the periphery of a rotatable gun carrier, which is rotatably mounted about a vertical main axis of rotation. Each of the eight guns is connected to the reservoir by a conduit, so that material under gas pressure can pass from the reservoir to the guns. During operation of the apparatus, the gun carrier rotates at high speed about the main axis of rotation, and the parts in the form of can lids for beverage cans, to which the liquid material is applied as a sealant, are fed to the apparatus in large numbers per unit time. The material from the reservoir is applied to the individual can lids via the guns, the gun carrier being in rotation. New can lids are continuously fed to the apparatus and the can lids that have been coated with the material are continuously discharged.

An electromagnetic flow meter is arranged between the reservoir and the individual gun. The flow meter is attached to the gun carrier and therefore rotates with the gun carrier about the main axis of rotation. The flow meter detects the flow rate supplied to the individual gun. By using the flow meter, it is intended that a constant film weight per part is obtained. On the one hand, this means that only as much material as required is used. On the other hand, the application quantity or the film weight per part must also not be too small, otherwise the effect intended for the material will not occur reliably.

The effort required to obtain a constant application quantity or a constant application weight with the aid of the individual flow meters is comparatively high. A flow meter must be provided for each gun, which makes the construction of the apparatus complex. The flow meter must be designed in such a way that the centrifugal forces acting on it during rotation of the gun carrier do not have a negative influence on its functionality.

For an apparatus for applying the liquid material without the flow meters described above, the application quantity can also be monitored according to a simple method described in WO 2019/120919 and also known from other prior art. In this case, during operation of the apparatus, individual parts applied with the material are randomly sorted out. For these parts, the applying amount is then determined by measurement. Between the random samples, which may be several hours apart, the apparatus runs through without any control of the application quantity. There is therefore a risk that between two random samples the application weight changes unnoticed, for example due to external circumstances, and the parts coated during this time are unusable. In addition, if the random sample shows that the application quantity is outside the specified tolerance, the ongoing operation of some of the apparatus known in the prior art must be interrupted and appropriate re-adjustments must be made to the apparatus.

It is therefore the object of the invention to provide an apparatus for applying a liquid material to a plurality of parts which is of simple construction, operates reliably and can be operated as far as possible without interruption.

This object is solved by an apparatus according to claim 1. Examples of embodiments of the invention can be taken from the subclaims to claim 1.

According to the invention the pressure system of the apparatus comprises a pressure regulator, by means of which the gas pressure acting on the material can be adjusted. In addition, the pressure system comprises a pressure sensor for detecting the gas pressure. The apparatus comprises a temperature sensor for detecting the temperature of the material and a control unit. In the control unit, a material-specific function is stored which specifies a setpoint value for the gas pressure wherein the gas pressure depends on the detected temperature. On the basis of the setpoint value, the control unit can calculate a signal with which the pressure regulator is controlled or actuated. The gas pressure acting on the material may be increased or reduced depending on the detected temperature during operation of the apparatus. Compressed air may be used to generate the gas pressure. That means that air can be used as gas.

By changing the gas pressure, the flow through the material gun (gun) can be influenced. The invention is based on the knowledge that, in particular in the case of water-based sealants such as the product Darex WBC 4721 from the company Henkel, which can be used as an applicator material, the temperature of the sealant has an influence on its viscosity, which in turn has an influence on the flow rate through the guns of the apparatus. Therefore, to the extent that a material is used whose viscosity increases with decreasing temperature, when the temperature decreases, the reduction in flow rate (application quantity or film weight) can be mitigated or fully compensated for by increasing the gas pressure. The invention allows the flow rate to be kept constant or nearly constant as the temperature of the material fluctuates. The temperature of the material may vary throughout the day. For example, the temperature may be greater at midday than in the morning or at night due to strong solar radiation. The invention can avoid the need to re-adjust the individual guns when the temperature varies (for example, if the gun comprises a nozzle, by axially moving a nozzle needle to change the nozzle cross-section of the nozzle) in order to adjust the flow resistance or flow cross-section in the nozzle to the changed conditions.

In one embodiment of the invention, more than 100 parts per minute and gun can be coated with the liquid material, for instance a liquid sealant. This is therefore a high speed application or mass production with a very high throughput. It may take only a fraction of a second to coat a single part. With a preferred embodiment of the invention, more than 1000 or even more than 1500 parts per minute can be coated with the liquid material, if the apparatus comprises more than a single gun, for example eight guns.

In one embodiment, the function is monotonically decreasing. With increasing temperatures, the set point values for the gas pressure become smaller. Such a function can be used to keep the film weight per part constant for a liquid material whose viscosity decreases with increasing temperatures or increases with decreasing temperatures. In response to the flow resistance through the gun or through the conduit system between the reservoir and the gun, where the flow resistance becomes greater due to the increased viscosity, the gas pressure is thereby increased. Preferably, the set point value for the gas pressure is determined in such a way that the application quantity (or film weight pro part) remains constant.

The function depends on the material to be applied by the apparatus. For example, if the material has a viscosity that decreases strongly with increasing temperatures, the function for the gas pressure setpoint value will have a pronounced negative slope if the apparatus is to provide a constant application rate (constant flow through the guns) at different temperatures. Thus, different functions can be stored in the control unit for different materials. For example, if material A is applied with the apparatus, a function fA stored for material A should be used for the operation of the apparatus.

The function can be a straight line that has a constant slope. Alternatively, the function can also have an asymptotic course or other formed courses. The function is intended to specify exactly one setpoint value for the gas pressure for each temperature value detected. The function does not necessarily have to be a function equation stored or programmed in the control unit. The function can also be a table of pairs of values (temperature; setpoint value for gas pressure). If, during operation of the apparatus, the detected temperature is between two temperature values of adjacent pairs of values, the control unit may also determine the corresponding setpoint value by weighted interpolation of the corresponding setpoint values. The function may therefore be understood simply as a stored or programmed calculation basis by which, given a temperature value, a setpoint value for the gas pressure is determined exactly. Preferably, the control unit is in the form of a programmable logic controller (PLC).

In one embodiment, the temperature sensor is arranged in the reservoir. Thus, the temperature of the material in the reservoir is measured. The temperature sensor can alternatively be placed as close as possible to the first gun or can be arranged in the gun. If the temperature sensor is arranged in the reservoir, the temperature of the material can be only measured once centrally in the reservoir, even if the apparatus comprises more than one gun. This simplifies the design of the apparatus according to the invention.

Preferably, the control unit calculates a difference from the setpoint value of the gas pressure and the detected gas pressure (actual gas pressure). The difference can then be used to calculate or determine a signal with which the pressure regulator can be actuated. Preferably, this is an electrical signal that can be provided by the control unit as an output signal to the pressure regulator.

At least a second gun can be provided, wherein the reservoir is fluidically connected not only with the first gun, but also with the second gun.

In one embodiment, the first gun and the second gun are connected to the gun carrier, which is rotatably mounted about the main axis of rotation. Preferably, the main axis of rotation extends in a vertical direction. The gun carrier, which may have a substantially rotationally symmetrical shape, may have a retaining arm on its periphery for each gun. The guns are preferably evenly distributed around the circumference of the gun carrier. For example, in the case of eight guns, viewed in the circumferential direction, the angular distance between two adjacent guns would be 45°.

In one embodiment, the reservoir or at least a first portion of the reservoir is fixed and does not rotate with the gun carrier. In this case, the reservoir is rotatably connected to the gun carrier. The gun carrier may house a second portion of the reservoir, in which case the second portion of the reservoir rotates with the gun carrier. A pressure-tight connection may be provided between the first stationary portion and the rotatable second portion of the reservoir, allowing relative rotational movement between the first portion and the second portion of the reservoir.

The gun carrier may be non-rotatably connected to a rotary plate which rotates with the gun carrier about the main axis of rotation. The rotary plate may comprise a part carrier and at least a second part carrier, the first part carrier being associated with the first gun and the second part carrier being associated with the second gun. The first part carrier and the second part carrier may each be rotatably mounted about a respective axis of rotation. The respective axis of rotation may be parallel to the main axis of rotation. Preferably, a distance between the axis of rotation of the first part carrier corresponds to a distance between the axis of rotation of the second part carrier and the main axis of rotation. In operation of the apparatus with the gun carrier/rotating plate rotating, the part carriers (also called chucks) can rotate around their own axis in order to apply the liquid material on several turns of the parts (for example 2 to 3 turns).

A further problem underlying the invention, namely to provide a method by which the material-specific function for the control unit of the above-described apparatus can be determined simply and with sufficient accuracy, is solved by claim 9. Examples of embodiments of the invention can be taken from the subclaims to claim 9.

According to the invention, different temperatures of the material are predetermined via a heat unit. The gas pressure is adjusted in dependence on the predetermined temperature such that an application amount discharged through the first gun is the same for each of the different temperatures. The function is determined on the basis of the adjusted gas pressures and the predetermined temperatures.

The heat unit can thus be used to set a first temperature which can represent a lower limit for the temperature range in which the temperatures of the material are expected to lie when the apparatus is in operation. In addition, a target film weight per part is set at which the parts are to be coated. For this first temperature, the gas pressure is then adjusted so that the first gun (or a gun identical in construction to the guns of the guns of the apparatus) applies the target application film weight. The gas pressure can thereby be manually adjusted via the pressure regulator. Thus, a first pair of values is obtained, comprising the first temperature and the gas pressure associated with the first temperature (first gas pressure). By means of the heat unit, by means of which different amounts of heat can be supplied to or dissipated from the material via adjustment means, a second temperature is set after determining the first pair of values for the material, which temperature is, for example, 3 to 5° higher than the first temperature. Since the changed temperature changes the viscosity of the material and thus also the flow resistance through the first gun, the gas pressure is readjusted (manually) in order to achieve the target film weight again. This creates a second pair of values (second temperature/second gas pressure). In this way, further value pairs can be determined by further increasing the temperature and adjusting the corresponding gas pressures to obtain the same target film weight in each case.

The pairs of values can be used in a next step for a regression analysis in order to determine a regression line or, more generally, a regression function. The function for the regression line $F=m*T+a$ has a coordinate intercept a (nominal value for the gas pressure at a temperature of 0°) and a slope m. An example value for the coordinate intercept is in a range between 20 and 25 psi. An example value for the slope m is in a range between −0.1 and −0.2 psi/° C. At this point it should be emphasized that the values a, m depend on the material applied through the first gun. Different values of m, a will then result for different materials. The function determined in this way can finally be implemented in the control unit, for example by a programming process.

The heat unit may comprise a double tube having an inner tube and an outer tube surrounding the inner tube, the inner tube passing the material to the first gun and the outer tube passing a heat medium through which the material is heated or cooled. The heat medium may be water. The double pipe provides a simple means of bringing the material to a desired temperature before entering the first gun. By using the double pipe, the time-consuming tempering of the material in the reservoir can be avoided. It should be noted here that the entire apparatus need not necessarily be used for the method according to the invention. It is sufficient if only its gun or a gun of identical construction is used, whereby the temperature of the material upstream of the gun can be adjusted by the heating unit. It is believed, without to be bound to this theory, that possible differences between the temperature of the material in the reservoir during operation of the apparatus and the temperature of the material downstream of the heat unit during the method of determining the function are negligible. Therefore, the method according to the invention provides a simple way of determining with sufficient accuracy the function of the set point value of the gas pressure as a function of the temperature measured in the reservoir in an embodiment of the apparatus according to the invention.

When determining the function, the temperature of the material can be detected between the double pipe and the first gun. It is easily possible to locate a corresponding temperature sensor upstream from the first gun. As already stated above, any differences between the temperature of the material directly in front of the gun and the temperature in the reservoir of the apparatus can be neglected to a good approximation.

BRIEF DESCRIPTION OF THE DRAWINGS

In the following, the invention is explained in more detail by means of an exemplary embodiment and with reference to the attached figures. In the figures.

DETAILED DESCRIPTION OF EMBODIMENTS

Figure 1:
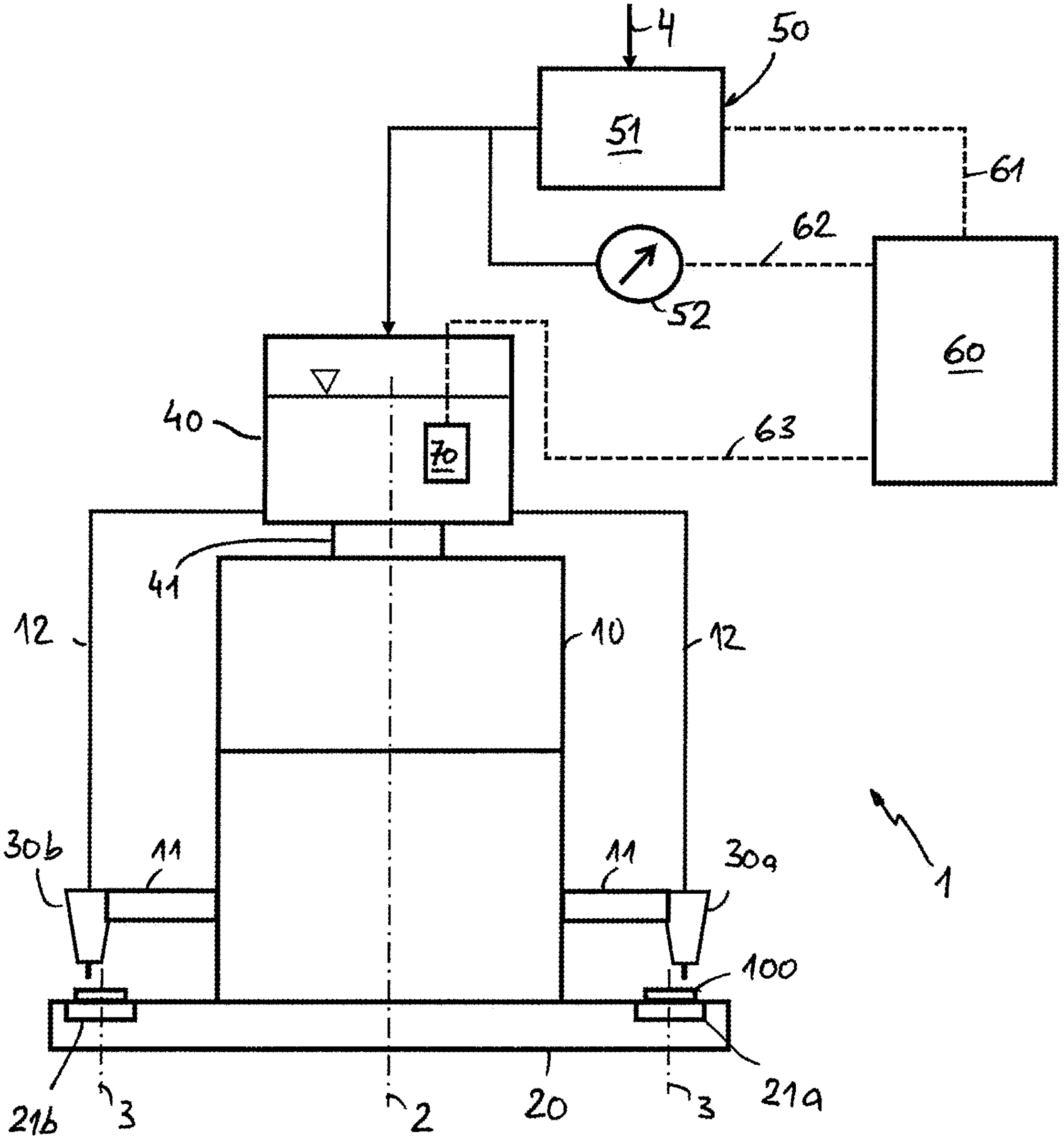
FIG. 1 shows an apparatus for applying a liquid material according to the invention in schematic view.

FIG. 1 schematically shows an apparatus 1 for applying a liquid material to a plurality of parts 100, in this case in the form of round metal can lids for example for food cans, beverage cans or beer cans. The apparatus 1 comprises a gun carrier 10 which is rotatably mounted about a main axis of rotation 2. A rotary plate 20 for receiving the parts 100 is non-rotatably connected to the gun carrier 10. Accordingly, the gun carrier 10 and the rotary plate 20 form a group which can rotate about the main axis of rotation 1.

The gun carrier 10, which is preferably substantially rotationally symmetrical, has retaining arms 11 for a first gun 30*a* and for a second gun 30*b*, respectively. The first gun 30*a* and the second gun 30*b* are intended to be representative of a plurality of guns which are uniformly distributed around the circumference of the gun carrier 10. The gun 30*a* is to be associated with a first part carrier 21*a*, which is rotatably mounted about its own axis of rotation 3. The gun 30*b* is associated with a second part carrier 21*b*, which can also rotate about its own axis of rotation. During operation of the apparatus 1, the assembly of the gun carrier 10 and the rotary plate 20 rotates about the main axis of rotation 2. At the same time, the part carriers 21*a*, 21*b* and the parts 100 arranged thereon rotate about the respective axis of rotation 3. During the rotation about the main axis of rotation 2, uncoated parts are continuously fed to the apparatus 1 and coated parts are continuously discharged.

A counter pad which presses the part 100 against each part carrier is not shown in FIG. 1. A proximity sensor can be installed below the counter pad for the detection of the part 100. If the proximity sensor indicates the presence of a part, the respective gun 30*a*, 30*b* receives an opening signal which opens a nozzle in the gun. Without any opening signal the gun 30*a*, 30*b* remain closed.

The apparatus 1 comprises a reservoir 40 in which the material to be applied is stored. In the embodiment shown here, the reservoir 40 rotates with the gun carrier 10. A reservoir connection 41 is provided between the reservoir 40 and the gun carrier 10 and connects the reservoir 40 with the gun carrier 10. From the reservoir 40, the material is directed to the individual guns 30*a*, 30*b* via pressure lines 12.

A pressure system 50 of the apparatus 1 ensures that the material in the reservoir 40 is under a certain gas pressure or air pressure. The pressure system 50 comprises a pressure regulator 51 and a pressure sensor or gauge 52, which measures the pressure in a pressure conduit 53 between the pressure regulator 50 and the reservoir 40. The pressure regulator 51 is supplied with compressed air 4 from a compressed air system not shown here. The pressure regulator 51 and the pressure sensor 52 can be part of a single device.

The apparatus 1 further comprises a control unit 60, which is connected to the pressure regulator 51 via a signal line 61. In addition, a signal line 62 is provided between the pressure sensor or manometer 52 and the control unit 60. A signal line 63 connects the control unit 60 to a temperature sensor 70 arranged in the reservoir 40. The temperature sensor 70 measures the temperature of the material located in the reservoir 40.

Figure 2:
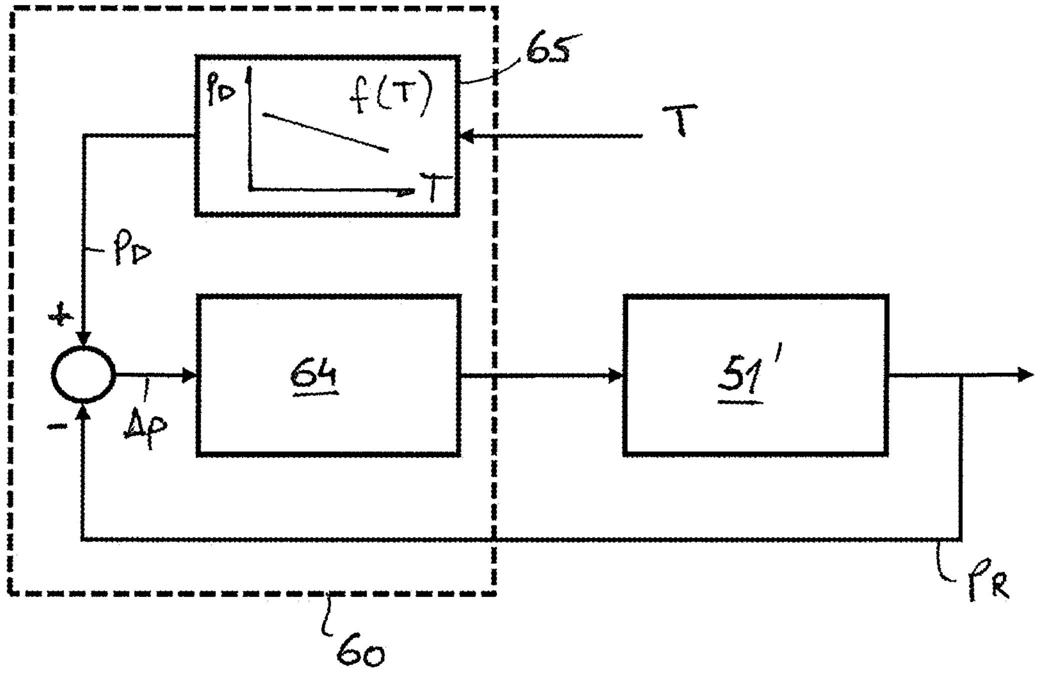
FIG. 2 shows a schematic view of a control circuit useful with the apparatus of FIG. 1.

The tasks of the control unit 60 are explained with reference to FIG. 2. FIG. 2 shows a control circuit for a set pressure pD. During operation of the apparatus 1, the control unit 60 receives a signal or a measured temperature value T from the temperature sensor 70. A function f(T) stored in the control unit (see transmission block 65) converts the measured temperature T into a setpoint value pD for the gas pressure/air pressure. The control unit 60 then compares this setpoint value pD (desired pressure) with a measured pressure pR (real pressure) and calculates a difference Δp between these two pressure values. From the pressure difference Δp, the control unit 60 determines a signal (see transmission block 64) and sends this to the pressure regulator 51. In the control circuit of FIG. 2, the pressure regulator 51 is represented by a transmission block $\mathbf{51}^I$, where the transmission block $\mathbf{51}^I$ represents the conversion of the signal received from the control unit into a pressure value.

Figure 3:
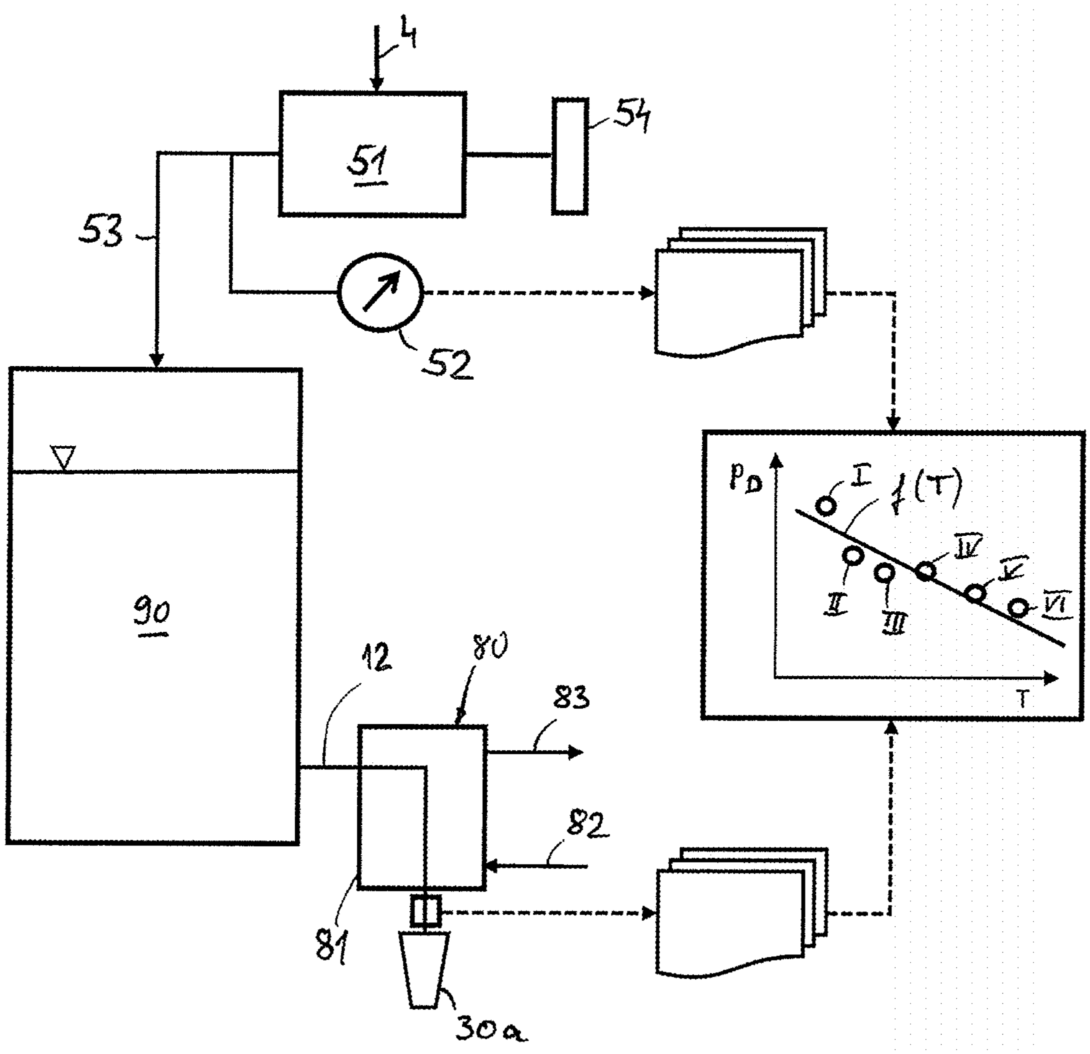
FIG. 3 shows a schematic system for determining a function for a control unit of the apparatus of FIG. 1.

A way of determining the function f(T) stored or programmed in the control unit according to the invention is explained with reference to FIG. 3. Components which are similar or identical to the components in FIG. 1 are given the same reference signs.

A heat unit 80 may include a double tube 81, shown here only schematically, having an inner tube and an outer tube encasing the inner tube. The inner tube is connected to or forms part of the conduit 12, and material from the reservoir 90 passes through the conduit 12 and the inner tube to the first gun 30*a*. The gun 30*a* is a gun of the apparatus 1 or at least a gun of identical construction.

A heat medium, preferably heated water, flows through the outer tube. The water allows the material flowing through the inner tube of the heat unit to be heated or, if cooling water is used, to be cooled. The arrow 82 is to represent the water entering the outer tube. The arrow 83 denotes the outgoing water. With a temperature sensor 71, which is here arranged between the heat unit 80 and the first gun 30*a*, the temperature of the material before entering the gun 30*a* can be measured.

The reservoir 90 may be a reservoir being distinct from the reservoir 40 of the apparatus 1. However, the reservoir 90 may also be or represent the assembly consisting of the reservoir 40 and the gun carrier 10 of the apparatus 1.

The material can be heated (or cooled) to a certain temperature via the amount and temperature of the incoming water 82. In the method according to the invention, when determining the function f(T), a certain target film weight is predetermined, which expediently corresponds to the film weight with which the parts 100 are to be coated by the apparatus 1. Given the temperature and the predetermined target film weight or application amount, adjustment means 54, which may be a manual actuator, is used to adjust the pressure regulator so that the desired target application amount is obtained at the gun 30*a*. The temperature and the adjusted gas pressure detected by the pressure sensor constitutes a first pair of values I. By changing the parameters of the incoming water 82, the material can be brought to further different temperatures. In each case, the gas pressure must be re-adjusted so that the specified target film weight is again obtained. Thus, further pairs of values II to VI (any number of pairs is possible) can be formed, from which a function f(T) can then be calculated via a regression analysis. This function f(T), which has its validity only for a specific material, can be stored in the control unit 60 of the apparatus 1. For another material with different properties, in particular with regard to the temperature-dependent viscosity, the procedure described above must be carried out again.

LIST OF REFERENCE SIGNS

1 apparatus
2 main axis of rotation
3 rotation axis
4 compressed air
10 gun carrier
11 retaining arm
12 conduit
20 rotary plate
21 part carrier (21*a* first part carrier; 21*b* second part carrier)
30 gun (30*a* first gun; 30*b* second gun)
40 reservoir
41 reservoir connection
50 pressure system
51 pressure regulator
51$^{I}$ transmission block for pressure regulator 51
52 pressure sensor/manometer
53 pressure conduit
54 adjustment means
60 control unit
61 signal line
62 signal line
63 signal line
64 transmission block
65 transmission block
70 temperature sensor
71 temperature sensor
80 heat unit
81*d* double tube
82 incoming water
83 outgoing water
90 reservoir
100 part

The invention claimed is:

1. A method for determining a material-specific function for a control unit of an apparatus for applying a liquid material to a plurality of parts, said apparatus comprising:

at least one first gun through which the material can be applied to the parts;

a reservoir for holding the material, the reservoir being fluidically connected to the at least one first gun;

a pressure system for providing a gas pressure acting on the material located in the reservoir, the pressure system comprising a pressure regulator by means of which the gas pressure acting on the material can be adjusted, and a pressure sensor for detecting the gas pressure acting on the material;

a temperature sensor for detecting temperature of the material;

a control unit in which a material-specific function is stored which specifies a setpoint value for the gas pressure which depends on the detected temperature of the material;

wherein the method comprises predetermining different temperatures of the material via a heat unit; setting the gas pressure, depending from the predetermined temperature, such that a film weight per part emitted by the at least one first gun is the same for the different temperatures in each case, wherein the material-specific function is determined on the basis of the set gas pressures and the predetermined temperatures.

2. The method according to claim 1, wherein the material-specific function outputs setpoint values which become smaller as the detected temperature of the material increases.

3. The method according to claim 2, wherein the function is a straight line.

4. The method according to claim 1, wherein the temperature sensor is arranged in the reservoir and detects the temperature of the material located in the reservoir.

5. The method according to claim 1, wherein the control unit determines a signal from a difference between the setpoint value and the detected gas pressure, and with the signal the pressure regulator can be actuated.

6. The method according to claim 1, comprising at least one second gun, wherein the reservoir for holding the material is fluidically connected to the at least one second gun.

7. The method according to claim 6, wherein the at least one first gun and the at least one second gun are connected to a gun carrier which is rotatably mounted about a main axis of rotation.

8. The method according to claim 7, wherein the reservoir or at least a part of the reservoir is fixed and rotatably connected to the gun carrier.

9. The method according to claim 7, wherein the gun carrier is connected in a rotationally fixed manner to a rotary plate which comprises a first part carrier and a second part carrier, the first part carrier being assigned to the at least one first gun and the second part carrier being assigned to the at least one second gun, the first part carrier mounted rotatably about its own axis of rotation and the second part carrier mounted rotatably about its own axis of rotation.

10. The method of claim 1, wherein the heat unit comprises a double tube having an inner tube and an outer tube that encloses the inner tube; wherein the material is passed through the inner tube to the at least one first gun and wherein through the outer tube a heat medium is passed by which the material is heated or cooled.

11. The method of claim 10, wherein the temperature between the double tube and the at least one first gun is detected.

* * * * *